April 20, 1937.  G. PERRY  2,078,156
RADIOLOGIST'S SCALE RULER
Filed Jan. 2, 1936
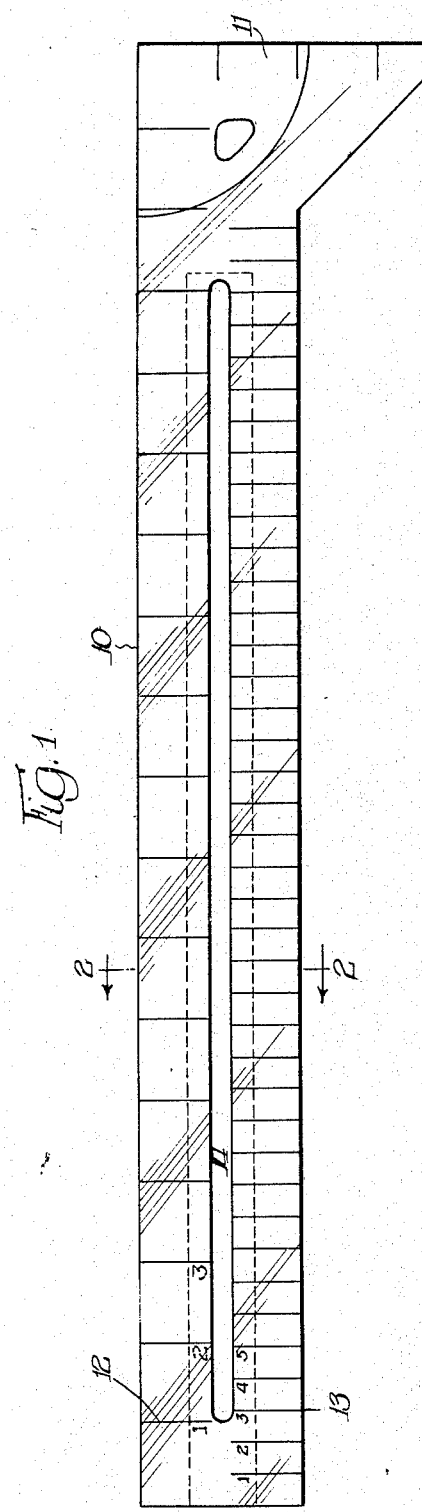
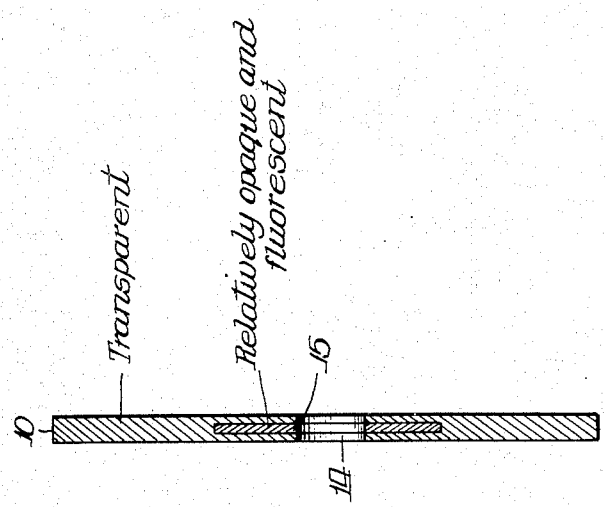
Inventor:
Gentz Perry,
By Murray & Murray attys.

Patented Apr. 20, 1937

2,078,156

UNITED STATES PATENT OFFICE 2,078,156

RADIOLOGIST'S SCALE RULER

Gentz Perry, Evanston, Ill.

Application January 2, 1936, Serial No. 57,112

7 Claims. (Cl. 33—107)

My invention relates to measuring devices and particularly to a scale adapted for use by radiologists, physicians or others.

It frequently happens that measurements must be made of parts of the body shown in X-ray negatives, these measurements being made by disposing the negative upon a lighted surface. I have found that such measurements are relatively difficult with an ordinary transparent scale and to accomplish the purpose in a much improved manner I have provided a scale composed of transparent material, having a centrally longitudinally disposed insert of a relatively opaque material. Preferably, also, the opaque material borders a longitudinal opening or slit in the scale. Graduations, in inches at one side and in centimeters at the other side, are provided at the respective side edges. Thus a reading may be made with ease and great accuracy, due to the different relative densities to light of the two materials.

I have found also that in the use of a fluoroscope, a scale of unusual characteristics is required and I have adapted my scale for such use by constructing the relatively opaque portion of a material that is fluorescent to X and radium rays. By disposing graduations and measurements on the scale by the use of material that is relatively non-fluorescent, I am able to make measurements with great accuracy during the fluoroscopic studies.

The invention will be more readily understood by reference to the accompanying drawing, in which;

Fig. 1 is an elevation of a scale constructed in accordance with my invention, and;

Fig. 2 is an enlarged sectional view therethrough.

In the drawing I have illustrated the scale as composed of a length of transparent material 10, a quadrant 11 being preferably included as a part thereof. One side edge of the scale is provided with graduations, 12, in inches, and the other side with similar graduations, 13, in centimeters. A centrally located, longitudinally extending slit or opening 14 is provided, and bordering the slit is a section of relatively opaque material 15, shown in this instance as an insert that is molded in the body of the scale. Preferably this insert will be composed of a material that is fluorescent to X and radium rays, that is, a material containing an ingredient in its composition such as calcium tungstate or a similar material. The graduations and numbers, such as indicated in the drawing, will be composed of material that is relatively non-fluorescent. The figures will thus stand out and be easily read during fluoroscopic examinations.

While I have described the insert as relatively opaque, it will be understood that it will be slightly translucent to ordinary light which will facilitate the reading of the figures when the scale is imposed on a film or negative with a lighted background. The figures may be imposed on the insert or on the transparent material as may be found to be the more convenient.

In the use of the scale for making measurements on a negative that is lighted by a source of light located behind the negative, the room is preferably darkened. The scale of my invention being placed over the negative, the light passes freely through the transparent portion, and, of course, through the opening in the scale. The section of opaque material, however, provides a sharp contrast and serves to accentuate the graduations and markings. This enables accurate and reliable measurements that are not otherwise possible.

The use of the scale in connection with a fluoroscope is obvious. The portion that is fluorescent will glow under the influence of the rays and the graduations and markings, being non-fluorescent, will be clearly outlined and easily readable.

Obviously the same result may be secured by varying some of the illustrated features and I do not wish to be limited except as indicated in the appended claims.

I claim:

1. A scale for use in measuring lighted negatives, consisting of a length of transparent material provided with graduations and having a longitudinal opening, and a section of relatively opaque material bordering said opening.

2. A scale of the class described, consisting of a length of transparent material having graduations thereon and provided with a central longitudinal slit, and a section of relatively opaque material bordering the two sides of said slit.

3. A scale of the class described consisting of a length of a transparent material having a longitudinal opening, a section of relatively opaque material surrounding said opening, and graduations at the respective edges of the transparent and opaque portions.

4. In combination, a length of transparent material, and a section of relatively opaque material located between the side edges of said transparent material, said section of relatively opaque material being fluorescent to X or radium rays.

5. A scale for use with a fluoroscope consisting of a length of material that is generally opaque to ordinary light and having numbered graduations thereon, said material being fluorescent to X or radium rays and said numbered graduations being relatively non-fluorescent.

6. A scale for use with a fluoroscope consisting of a length of transparent material having a longitudinal insert composed of a material that is fluorescent to X and radium rays, said scale being provided with graduations that are relatively non-fluorescent.

7. A scale for use in measuring lighted negatives consisting of a length of transparent material having a side edge, graduations extending across said scale and terminating at said edge and a section of relatively opaque material inset along said edge.

GENTZ PERRY.